Dec. 12, 1961 M. MENDELSOHN 3,013,099
SEPARATOR FOR ELECTRIC BATTERIES
Filed June 22, 1956
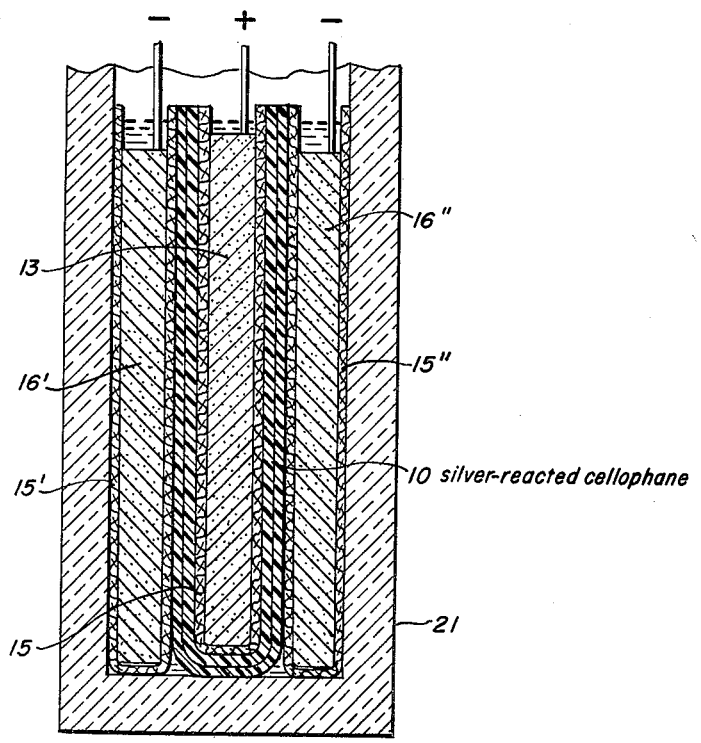
INVENTOR:
MEYER MENDELSOHN
BY
*Karl F. Ross*
AGENT United States Patent Office 3,013,099
Patented Dec. 12, 1961

3,013,099
SEPARATOR FOR ELECTRIC BATTERIES
Meyer Mendelsohn, New York, N.Y., assignor, by mesne assignments, to Yardney International Corp., New York, N.Y., a corporation of New York
Filed June 22, 1956, Ser. No. 593,122
6 Claims. (Cl. 136—146)

My present invention relates to separators for electric batteries, more particularly (but not exclusively) for alkaline primary or secondary batteries of the rechargeable silver-zinc type. This application in part describes subject matter originally disclosed in application Ser. No. 285,785 (now abandoned), filed May 2, 1952, and applications Ser. No. 294,908, filed June 21, 1952, now abandoned, Ser. No. 345,741, filed March 30, 1953, and Ser. No. 304,854, filed August 16, 1952, now Patent No. 2,785,106.

In batteries of this and related types it is known, in accordance with the teachings of U.S. Patent No. 2,594,709, issued April 29, 1952, to Henri André, to provide semi-permeable separators of, for example, regenerated cellulose (cellophane) positioned under pressure between adjacent electrodes of opposite polarities. The resulting close contact between the separator material and a powerful oxidizing agent, such as silver peroxide $Ag_2O_2$, present at the positive electrode or electrodes in the charged condition of the battery, as well as the presence of other active substances causes topochemical oxidation and possibly other structural changes of the cellulosic sheets forming the separator, thereby tending to weaken same and to make it more readily penetrable by migrating metal ions and metallic growths which would eventually short-circuit the battery. Remedies previously proposed include, besides the obvious expedient of increasing the number of cellophane layers (at the cost of greater weight, volume and internal resistance), the interposition of porous spacers (e.g. of filter-type or other paper) between the semi-permeable material and the electrodes; these arrangements, while generally satisfactory, have up to now not proved effective to extend the useful life of a battery to anything approaching that which is believed to be the theoretical ultimate consistent with low weight, volume and internal resistance.

The general object of my present invention is to provide a semi-permeable separator consisting of one or more layers of organic sheet material exhibiting low oxidizability and penetrability.

A more specific object of this invention is to provide a separator of this character having all the advantages of a sheet of regenerated cellulose, such as low electrolytic resistance, small thickness and high flexibility.

In accordance with this invention, I provide a separator in the form of a reaction product of a cellulosic sheet material with a water-soluble silver salt. The reaction, which may conveniently be carried out at temperatures ranging between 50° and 100° C., preferably takes place in the presence of a suitable catalyst, such as sodium acetate or potassium acetate, as described and claimed in my aforesaid co-pending application Ser. No. 304,854, now Patent No. 2,785,106.

The reaction product appears to contain the silver in compound form, as evidenced by the conventional silver precipitation test using a solution of sodium chloride into which the treated sheet material is dipped. Moreover, the silver cannot be readily washed out or separated from its cellulosic base by mechanical means.

*Example*

A 1% solution of silver nitrate $AgNO_3$, containing about 1% of sodium (or potassium) acetate, is heated to a temperature of about 70° to 80° C. Cellophane (regenerated cellulose) is immersed in this solution for a period of 30 to 60 minutes. The resulting film, after washing and drying, is darkly colored and has a silver content ranging between about 1% and 2% by weight; this film when used as an inter-electrode separator exhibits oxidation resistance greatly superior to that of ordinary cellophane sheets without appreciable reduction in its electrolytic permeability.

The sole figure of the accompanying drawing shows, by way of example, a separator according to the invention forming part of a silver-zinc battery as described above. A positive electrode 13 is surrounded by a permeable wrapper 15, e.g. a web of artificial fibers (such as nylon), the latter in turn being enveloped in a separator 10 consisting of two layers of cellophane treated as described above. This assembly is flanked by two negative electrodes 16', 16" having permeable wrappers 15', 15". The entire electrode assembly is inserted in a tightly fitting casing 21 in which it is held under pressure by the swelling of the cellulosic separator material in an alkaline electrolyte, as fully disclosed in the aforesaid André Patent No. 2,594,709. As likewise set forth in that patent, positive electrode 13 consists essentially of silver which is in a state of oxidation when the battery is charged, the active material of the negative electrodes 16', 16" being zinc which is oxidized, at least to a substantial extent, in the discharged condition of the battery. The arrangement of the positive and negative plates and of the separator sheet 10 may, of course, be modified and the number of such plates varied without departing from the spirit and scope of the invention as defined in the appended claims.

I claim:
1. In an electrochemical generator, in combination, a positive electrode, a negative electrode and a separator interposed between said electrodes said separator comprising silver cellulose.
2. An electrochemical generator according to claim 1 wherein said separator comprises regenerated cellulose having incorporated therein silver cellulose, said silver being present in the amount of about one percent by weight of cellulose.
3. In an electrochemical generator, in combination a positive electrode containing silver, a negative electrode containing a metal more electronegative than silver and a semi-permeable separator interposed between said electrodes, said separator comprising silver cellulose.
4. An electrochemical generator according to claim 3 wherein said negative electrode contains zinc.
5. An electrochemical generator according to claim 4 wherein said separator comprises regenerated cellulose having incorporated therein silver cellulose, said silver being present in the amount of about one percent by weight of cellulose.
6. An electrochemical generator according to claim 5 including an alkaline electrolyte.

References Cited in the file of this patent
UNITED STATES PATENTS

| | | |
|---|---|---|
| 2,101,326 | Woodbridge | Dec. 7, 1937 |
| 2,594,709 | André | Apr. 29, 1952 |
| 2,609,368 | Gauer | Sept. 2, 1952 |
| 2,610,219 | Yardney | Sept. 9, 1952 |
| 2,635,127 | Yardney et al. | Apr. 14, 1953 |
| 2,636,851 | Juda et al. | Apr. 28, 1953 |
| 2,785,106 | Mendelsohn | Mar. 12, 1957 |
| 2,816,154 | Mendelsohn | Dec. 10, 1957 |